United States Patent [19]

Mark

[11] Patent Number: 4,533,511

[45] Date of Patent: Aug. 6, 1985

[54] PRODUCTION OF SYNTHETIC FIBERS

[75] Inventor: Hermann Mark, Brooklyn, N.Y.

[73] Assignee: Isovolta Osterreichische Isolierstoffwerke, Wiener Neudorf, Austria

[21] Appl. No.: 103,585

[22] Filed: Dec. 14, 1979

[30] Foreign Application Priority Data

Dec. 20, 1978 [AT] Austria .................................. 91151/78

[51] Int. Cl.$^3$ ................................................ D01D 5/06
[52] U.S. Cl. ................................... 264/184; 264/210.8
[58] Field of Search .................. 264/184; 528/176, 169, 528/190, 194

[56] References Cited

U.S. PATENT DOCUMENTS

| | | | |
|---|---|---|---|
| 2,924,500 | 2/1960 | Huffman et al. | 264/203 |
| 2,924,501 | 2/1960 | Wagner et al. | 264/203 |
| 2,924,502 | 2/1960 | Ucci et al. | 264/203 |
| 3,246,067 | 4/1966 | Boyer | 264/203 |
| 3,351,624 | 11/1967 | Conix | 528/176 |
| 3,388,097 | 6/1968 | Cramer | 528/194 |
| 3,457,343 | 7/1969 | Lohruizen et al. | 264/203 |
| 3,546,165 | 12/1970 | Morgan | 528/190 |
| 4,208,509 | 6/1980 | Wallrabenstein et al. | 264/203 |

*Primary Examiner*—Jay H. Woo
*Attorney, Agent, or Firm*—Bierman, Peroff & Muserlian

[57] ABSTRACT

A process for the spinning of synthetic fibers comprising dissolving at least one polycondensation product of at least one polyfunctional phenol component with the phenolic groups attached to a central carbon atom so they are hindered in their free rotation and at least one polyfunctional carboxylic acid chloride having an inherent viscosity $\eta$ inh greater than 0.5 dl/g in a solvent with a boiling point less than 100° C. to form a spinning solution, forcing the spinning solution through spinning nozzles into a liquid precipitant for fiber formation at a temperature at least 8° C. less than the solvent boiling point to withdraw the majority of the solvent from the fibers, stretching the resulting fibers to 2 to 6 times their length and removing the residual solvent.

4 Claims, No Drawings

PRODUCTION OF SYNTHETIC FIBERS

STATE OF THE ART

Spinning of synthetic fibers is known. U.S. Pat. No. 3,546,145 describes the spinning of a polycondensation product of 9,9-bis-(4-hydroxyphenyl)-fluorene and a mixture of isophthalic acid chloride and terephthalic acid chloride wherein the spinning solution is forced through spinning nozzles into a hot spinning gas but this process has not yet been commericalized. It has been found that the polyester in the fibers produced by this process has its molecular weight reduced by hydrolysis if the hot spinning gas contains an acid and is not completely free of water.

OBJECTS OF THE INVENTION

It is an object of the invention to provide a novel process for the spinning of polycondensation esters of bis phenols to obtain fibers having improved characteristics.

It is another object of the invention to provide the novel fibers of polyesters produced by the process of the invention.

These and other objects and advantages of the invention will become obvious from the following detailed description.

THE INVENTION

The process of the invention for the spinning of synthetic fibers comprising dissolving at least one polycondensation product of at least one polyfuctional phenol component with the phenolic groups attached to a central carbon atom so they are hindered in their free rotation of the formula

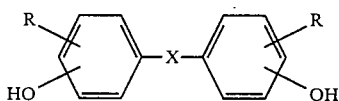

wherein each R is selected from the group consisting of hydrogen and lower alkyl and X is selected from the group consisting of:

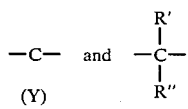

Y representing the atoms necessary to close a lower cycloaliphatic ring and R' and R" each is a member of the group consisting of hydrogen, an alkyl radical of 1 to 7 carbon atoms, a phenyl radical, a cycloalkyl radical of 4 to 8 carbon atoms and a haloalkyl of 1 to 7 carbon atoms radical and at least one polyfunctional carboxylic acid chloride having an inherent viscosity $\eta$ inh greater than 0.5 dl/g ih a solvent with a boiling point less than 100° C. to form a spinning solution, forcing the spinning solution through spinning nozzles into a liquid precipitant for fiber formation at a temperature at least 8° C. less than the solvent boiling point to withdraw the majority of the solvent from the fibers, stretching the resulting fibers to 2 to 6 times their length and removing the residual solvent.

The said polycondensation polyester products are known per se and are described for example in U.S. Pat. Nos. 3,546,165 and 3,351,624. The preferred polyfunctional carboxylic acids are phthalic acids such as phthalic acid, isophthalic acid, terephthalic acid and mixtures thereof and are in their acid chloride form although other acid halides may be used. Also useful are benzophenone dicarboxylic acid, naphthalene dicarboxylic acid, biphenyl dicarboxylic acid and methylene bis biphenyl dicarboxylic acid.

The polyesters with an inherent viscosity or $\eta$ inh of more than 0.5 dk/g is dissolved in a suitable spinning solvent with a boiling point less than 100° C. such as dichloromethane or 1,2-dichloroethane and the concentration is preferably adjusted to obtain a spinning solution having a viscosity of 15,000 to 30,000 cp at 25° C. In the spinning operation, the spinning solution is forced through spinning nozzles into a liquid precipitant with a temperature at least 8° C. less than the boiling point of the spinning solvent and the liquid threads are pulled through the liquid precipitant for a preferred length of about 1 to 3 meters to withdraw or remove the majority of the spinning solvent from the threads. The gelatinous fibers are preferably drawn at a rate of 80 to 120 m/min to form cables of a plurality of fibers and the cables are stretched to 2 to 6 times their original length and preferably passed through a heating zone to remove any residual solvent from the fibers.

The liquid precipitant is a liquid in which the spinning solvent is very soluble and therefore the spinning solvent is rapidly absorbed and removed from the fibers. When 1,2-dichloroethane is the spinning solvent, acetone is an excellent liquid precipitant. When dichloromethane is the spinning solvent, the liquid precipitant is preferably an aqueous lower alkanol.

The spinning solvent may be recovered from the resulting mixture with the liquid precipitant by any convenient physical means, preferably by fractional distillation. If the liquid precipitant is miscible with water and the spinning solvent is water-immiscible, the mixture may be diluted with water and the resulting two phase mixture may be separated by decanting.

The inherent viscosity of the polyester is an indication of the mean molecular weight and is determined by the formula $$\eta \text{ inh} = \frac{\ln \eta \text{ rel}}{C} \text{ (in dl/g)}$$

wherein $\eta$ rel is the relative viscosity and C is the concentration of polyester in the solvent of 60% phenol and 40% of tetrachloroethane. The measurements were made in a capillary viscosimeter at 30° C. and a polyester concentration of 0.5 g/1 dl solvent.

The viscosity of the spinning solution was determined by the falling ball method (FB) by determining the time for a steel ball with a diameter of 7.14 mm to pass 400 mm through the spinning solution in a vertical pipe at a constant temperature of 20° C. As a check for the method of determining FR viscosity values, reference measurements were made with a high pressure capillary viscometer for determining the viscosity values in cp (centipoise).

In the following examples there are described several preferred embodiments to illustrate the invention. However, it should be understood that the invention is not intended to be limited to the specific embodiments.

EXAMPLE 1

1.0 mole of 9,9-bis-(4-hydroxyphenyl)-fluorene in solution in 1,2-dichloroethane and a solution of 0.5 mole of isophthaloyl chloride and 0.5 mole of terephthaloyl chloride in 1,2-dichloroethane with triethylamine as an acid acceptor were admixed and allowed to react without heating for an hour as described in copending, commonly assigned U.S. patent application Ser. No. 58,272 filed July 17, 1979 now U.S. Pat. No. 4,247,681, to obtain a fluorene polyester (FPE) with an inherent viscosity of $\eta$ inh = 0.80 dl/g. 1.7 kg of the said polyester were dissolved in 8.3 kg of 1,2-dichloroethane to form 10 kg of clear spinning solution with an FB viscosity of 83 s/400 mm stored at 25° C.

The said spinning solution was forced at 25° C. with a pump through a glass nozzle with 200 orifices with a diameter of 0.12 mm mounted at one end of a spinning trough with a length of 1.5 m. The spinning solvent and acetone as the precipitant are fed concurrently to the spinning trough and the spun fibers are withdrawn from the trough at a rate of 120 m/min. In this fashion, the major part of the solvent in the spun fibers is removed so that the drawn fibers contain only about 20% of the solvent. The drawn spun fibers consist of gelatinous fibers which are stretched in a stretching device having a hot air duct to 3 times their original length and the circulating hot air removes any adhering liquid precipitant and the remaining solvent. The resulting mixture of spinning solvent and liquid precipitant can be separated by functional distillation.

The spun fibers have the following properties: titer of 2.3 den; elasticity modulus of $1.39 \times 10^6$ N/cm$^2$; tensile strength of $1.07 \times 10^4$ N/cm$^2$ (1.01 g/den); and tear elongation of 4.1%.

EXAMPLE 2

Using the procedure of Example 1, a fluorene polyester with an $\eta$ inh = 0.58 dl/g was prepared and 2.8 kg of the said polyester were dissolved in 7.2 kg of dichloromethane to form 10 kg of a spinning solution with a FB viscosity of 105 s/400 mm.

The spinning solution was spun using the apparatus of Example 1 with a precipitant of a mixture of 80% volume of methanol and 20% by volume of water with a spinning rate of 80 m/min. The spun fibers were then stretched as in Example 1 to twice their length. The mixture of liquid precipitant and spinning solvent is diluted with water and dichloromethane is separated by physical means such as decanting. The properties of the individual fibers were as follows: titer of 2.9 den; elasticity modulus of $1.26 \times 10^6$ N/cm$^2$; tensile strength of $0.95 \times 10^4$ N/cm$^2$ (0.90 g/den); and tear elongation of 5.8%.

EXAMPLE 3

A polyester of 1,1-bis-(4-hydroxy-phenyl)-1-phenylethane (diphenol B) and an equimolar mixture of isophthaloyl chloride and terephthaloychloride were reacted in a two-phase boundary surface to form a diphenol B polyester with an $\eta$ inh. = 0.76 dl/g. 1.9 kg of the said polyester were dissolved in 8.1 mg of 1,2-dichloroethane to obtain 10 kg of a spinning solution with a FB viscosity of 63 s/400 mm. The spinning procedure of Example 1 was repeated with the spinning solution to obtain individual fibers with the following properties: titer of 2.5 den; elasticity modulus of $1.41 \times 10^6$ N/cm$^2$; tensile strength of $1.03 \times 10^4$ N/cm$^2$ (0.97 g/den); and tear elongation of 7.8%.

EXAMPLE 4

A polyester of diphenol B was prepared by the procedure of Example 3 and the polyester had an $\eta$ inh = 0.53 dl/g. 3.0 kg of the said polyester were dissolved in 7.0 kg of dichloromethane to obtain 10 kg of a spinning solution with a FB viscosity of 94 s/400 mm. The resulting solution was spun by the procedure of Example 2 to obtain single fibers with the following properties: titer of 3.2 den; elasticity modulus of $1.18 \times 10^6$ N/cm$^2$; tensile strength of $0.91 \times 10^4$ N/cm$^2$; (0.86 g/den); and tear elongation of 6.2%.

Various modifications of the products and processes of the invention may be made without departing from the spirit or scope thereof and it is to be understood that the invention is intended to be limited only as define in the appended claims.

What is claimed:

1. A process for the spinning of synthetic fibers comprising dissolving at least one polycondensation product of at least one polyfunctional phenol component with the phenolic groups attached to a central carbon atom so they are hindered in their free rotation and at least one polyfunctional carboxylic acid having an inherent viscosity $\eta$ inh greater than 0.5 dl/g in a solvent with a boiling point less than 100° C. to form a spinning solution, forcing the spinning solution through spinning nozzles into a liquid precipitant for fiber formation at a temperature at least 8° C. less than the solvent boiling point to withdraw the majority of the solvent from the fibers, stretching the resulting fibers to 2 to 6 times their length and removing the residual solvent.

2. A process for the spinning of synthetic fibers comprising dissolving at least one polycondensation product of at least one polyfunctional phenol component with the phenolic groups attached to a central carbon atom so they are hindered in their free rotation of the formula

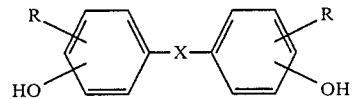

wherein each R is selected from the group consisting of hydrogen and lower alkyl and X is selected from the group consisting of

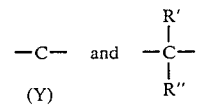

Y representing the atoms necessary to close a lower cycloaliphatic ring and R' and R" each is a member of the group consisting of hydrogen, an alkyl radical of 1 to 7 carbon atoms, a phenol radical, a cycloalkyl radical of 4 to 8 carbon atoms and a haloalkyl of 1 to 7 carbon atoms radical and at least one polyfunctional carboxylic acid chloride having an inherent viscosity $\eta$ inh greater than 0.5 dl/g in a solvent with a boiling point less than 100° C. to form a spinning solution, forcing the spinning solution through spinning nozzles into a liquid precipitant for fiber formation at a temperature at least 8° C. less than the solvent boiling point to withdraw the majority of the solvent from the fibers, stretching the resulting fibers to 2 to 6 times their length and removing the residual solvent.

3. The process of claim 1 wherein the liquid precipitant contains an organic solvent miscible with water.

4. The process of claim 2 wherein the liquid precipitate is a mixture of water and a water miscible organic solvent.

* * * * *